(12) United States Patent
Norin et al.

(10) Patent No.: US 7,991,348 B2
(45) Date of Patent: Aug. 2, 2011

(54) TRIPLE BAND COMBINING APPROACH TO SATELLITE SIGNAL DISTRIBUTION

(75) Inventors: John Norin, Redondo Beach, CA (US); Kesse Ho, Westminster, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 968 days.

(21) Appl. No.: 11/546,116

(22) Filed: Oct. 11, 2006

(65) Prior Publication Data

US 2007/0082603 A1 Apr. 12, 2007

Related U.S. Application Data

(60) Provisional application No. 60/725,781, filed on Oct. 12, 2005, provisional application No. 60/725,782, filed on Oct. 12, 2005, provisional application No. 60/726,118, filed on Oct. 12, 2005, provisional application No. 60/726,149, filed on Oct. 12, 2005, provisional application No. 60/726,150, filed on Oct. 12, 2005, provisional application No. 60/726,151, filed on Oct. 12, 2005, provisional application No. 60/727,143, filed on Oct. 14, 2005, provisional application No. 60/726,338, filed on Oct. 12, 2005, provisional application No. 60/754,737, filed on Dec. 28, 2005, provisional application No. 60/758,762, filed on Jan. 13, 2006, provisional application No. 60/726,337, filed on Oct. 12, 2005.

(51) Int. Cl.
*H04H 20/74* (2008.01)

(52) U.S. Cl. .................. 455/3.02; 455/12.1; 455/427

(58) Field of Classification Search ............. 455/3.02, 455/12.1–13.3, 427–429, 168.1, 176.1, 190.1, 455/313, 334; 370/316
See application file for complete search history.

(56) References Cited

U.S. PATENT DOCUMENTS

| | | | |
|---|---|---|---|
| 3,581,209 A | 5/1971 | Zimmerman |
| 3,670,275 A | 6/1972 | Kalliomaki et al. |
| 4,064,460 A | 12/1977 | Gargini |
| 4,132,952 A | 1/1979 | Hongu et al. |
| 4,354,167 A | 10/1982 | Terreault et al. |
| 4,382,266 A | 5/1983 | Panzer |
| 4,397,037 A | 8/1983 | Theriault |
| 4,403,343 A | 9/1983 | Hamada |
| 4,509,198 A | 4/1985 | Nagatomi |
| 4,513,315 A | 4/1985 | Dekker et al. |
| 4,530,008 A | 7/1985 | McVoy |

(Continued)

FOREIGN PATENT DOCUMENTS

CN 1413021 4/2003

(Continued)

OTHER PUBLICATIONS

Final Rejection dated Feb. 26, 2009, in U.S. Appl. No. 11/546,118, filed Oct. 11, 2006, by Kesse Ho et al.

(Continued)

*Primary Examiner* — Raymond S Dean

(57) ABSTRACT

A method, apparatus and system for combining signals in a satellite delivery system are disclosed. A first set of satellite signals are broadcast in a first frequency band, and downconverted to a first Intermediate Frequency (IF) band, and a second set of satellite signals are broadcast in a second frequency band and downconverted to a second IF band and a third IF band. A combiner receives the first, second, and third IF bands and combines the first, second, and third IF bands into a delivery signal. A distribution unit coupled to the combiner distributes the delivery signal to a plurality of outputs.

20 Claims, 5 Drawing Sheets

U.S. PATENT DOCUMENTS

| | | |
|---|---|---|
| 4,532,543 A | 7/1985 | Groenewegen |
| 4,538,175 A | 8/1985 | Balbes et al. |
| 4,545,075 A | 10/1985 | Miller et al. |
| 4,556,988 A | 12/1985 | Yoshisato |
| 4,592,093 A | 5/1986 | Ouchi et al. |
| 4,608,710 A | 8/1986 | Sugiura |
| 4,628,506 A | 12/1986 | Sperlich |
| 4,656,486 A | 4/1987 | Turner |
| 4,663,513 A | 5/1987 | Webber |
| 4,667,243 A | 5/1987 | Blatter et al. |
| 4,672,687 A | 6/1987 | Horton et al. |
| 4,675,732 A | 6/1987 | Oleson |
| 4,710,972 A | 12/1987 | Hayashi et al. |
| 4,723,320 A | 2/1988 | Horton |
| 4,761,825 A | 8/1988 | Ma |
| 4,761,827 A | 8/1988 | Horton et al. |
| 4,785,306 A | 11/1988 | Adams |
| 4,802,239 A | 1/1989 | Ooto |
| 4,805,014 A | 2/1989 | Sahara et al. |
| 4,813,036 A | 3/1989 | Whitehead |
| 4,823,135 A | 4/1989 | Hirashima et al. |
| 4,860,021 A | 8/1989 | Kurosawa et al. |
| 4,866,787 A | 9/1989 | Olesen |
| 4,876,736 A | 10/1989 | Kiewit |
| 4,885,803 A | 12/1989 | Hermann et al. |
| 4,903,031 A | 2/1990 | Yamada |
| 4,945,410 A | 7/1990 | Walling |
| 5,010,400 A | 4/1991 | Oto |
| 5,027,430 A | 6/1991 | Yamauchi et al. |
| 5,068,918 A | 11/1991 | Verheijen et al. |
| 5,073,930 A | 12/1991 | Green et al. |
| 5,119,509 A | 6/1992 | Kang |
| 5,235,619 A | 8/1993 | Beyers, II et al. |
| 5,249,043 A | 9/1993 | Grandmougin |
| 5,276,904 A | 1/1994 | Mutzig |
| 5,289,272 A | 2/1994 | Rabowsky et al. |
| 5,301,352 A | 4/1994 | Nakagawa et al. |
| 5,382,971 A | 1/1995 | Chanteau |
| 5,437,051 A | 7/1995 | Oto |
| 5,521,631 A | 5/1996 | Budow et al. |
| 5,565,805 A | 10/1996 | Nakagawa et al. |
| 5,572,517 A | 11/1996 | Safadi |
| 5,574,964 A | 11/1996 | Hamlin |
| 5,587,734 A | 12/1996 | Lauder et al. |
| 5,617,107 A | 4/1997 | Fleming |
| 5,675,390 A | 10/1997 | Schindler et al. |
| 5,708,961 A | 1/1998 | Hylton et al. |
| 5,734,356 A | 3/1998 | Chang |
| 5,748,732 A | 5/1998 | Le Berre et al. |
| 5,760,819 A | 6/1998 | Sklar et al. |
| 5,760,822 A | 6/1998 | Coutinho |
| 5,787,335 A | 7/1998 | Novak |
| 5,790,202 A | 8/1998 | Kummer et al. |
| 5,793,413 A | 8/1998 | Hylton et al. |
| 5,805,806 A | 9/1998 | McArthur |
| 5,805,975 A | 9/1998 | Green et al. |
| 5,835,128 A | 11/1998 | Macdonald et al. |
| 5,838,740 A | 11/1998 | Kallman et al. |
| 5,848,239 A | 12/1998 | Ando |
| 5,864,747 A | 1/1999 | Clark et al. |
| 5,883,677 A | 3/1999 | Hofmann |
| 5,886,995 A | 3/1999 | Arsenault et al. |
| 5,898,455 A | 4/1999 | Barakat et al. |
| 5,905,941 A | 5/1999 | Chanteau |
| 5,905,942 A | 5/1999 | Stoel et al. |
| 5,923,288 A | 7/1999 | Pedlow, Jr. |
| 5,936,660 A | 8/1999 | Gurantz |
| 5,959,592 A | 9/1999 | Petruzzelli |
| 5,970,386 A | 10/1999 | Williams |
| 5,982,333 A | 11/1999 | Stillinger et al. |
| 6,005,861 A | 12/1999 | Humpleman |
| 6,011,597 A | 1/2000 | Kubo |
| 6,023,603 A | 2/2000 | Matsubara |
| 6,038,425 A | 3/2000 | Jeffrey |
| 6,100,883 A | 8/2000 | Hoarty |
| 6,104,908 A | 8/2000 | Schaffner et al. |
| 6,134,419 A | 10/2000 | Williams |
| 6,147,714 A | 11/2000 | Terasawa et al. |
| 6,173,164 B1 | 1/2001 | Shah |
| 6,188,372 B1 | 2/2001 | Jackson et al. |
| 6,192,399 B1 | 2/2001 | Goodman |
| 6,198,449 B1 | 3/2001 | Muhlhauser et al. |
| 6,198,479 B1 | 3/2001 | Humpleman et al. |
| 6,202,211 B1 | 3/2001 | Williams, Jr. |
| 6,292,567 B1 | 9/2001 | Marland |
| 6,304,618 B1 | 10/2001 | Hafeez et al. |
| 6,340,956 B1 | 1/2002 | Bowen et al. |
| 6,397,038 B1 | 5/2002 | Green, Sr. et al. |
| 6,424,817 B1 | 7/2002 | Hadden |
| 6,430,233 B1 | 8/2002 | Dillon et al. |
| 6,430,742 B1 | 8/2002 | Chanteau |
| 6,441,797 B1 | 8/2002 | Shah |
| 6,442,148 B1 | 8/2002 | Adams et al. |
| 6,452,991 B1 | 9/2002 | Zak |
| 6,463,266 B1 | 10/2002 | Shohara |
| 6,486,907 B1 | 11/2002 | Farber |
| 6,493,873 B1 | 12/2002 | Williams |
| 6,493,874 B2 | 12/2002 | Humpleman |
| 6,501,770 B2 | 12/2002 | Arsenault et al. |
| 6,510,152 B1 | 1/2003 | Gerszberg et al. |
| 6,549,582 B1 | 4/2003 | Friedman |
| 6,574,235 B1 | 6/2003 | Arslan et al. |
| 6,598,231 B1 | 7/2003 | Basawapatna et al. |
| 6,600,730 B1 | 7/2003 | Davis et al. |
| 6,600,897 B1 | 7/2003 | Watanabe et al. |
| 6,622,307 B1 | 9/2003 | Ho |
| 6,653,981 B2 | 11/2003 | Wang et al. |
| 6,728,513 B1 | 4/2004 | Nishina |
| 6,738,609 B1 | 5/2004 | Clifford |
| 6,762,727 B2 | 7/2004 | Rochford et al. |
| 6,864,855 B1 | 3/2005 | Fujita |
| 6,865,193 B2 | 3/2005 | Terk |
| 6,879,301 B2 | 4/2005 | Kozlovski |
| 6,889,385 B1 | 5/2005 | Rakib et al. |
| 6,906,673 B1 | 6/2005 | Matz et al. |
| 6,941,576 B2 | 9/2005 | Amit |
| 6,944,878 B1 | 9/2005 | Wetzel et al. |
| 6,959,175 B2 | 10/2005 | Ohtaki |
| 7,010,265 B2 | 3/2006 | Coffin, III |
| 7,016,643 B1 | 3/2006 | Kuether et al. |
| 7,020,081 B1 | 3/2006 | Tani et al. |
| 7,039,169 B2 | 5/2006 | Jones |
| 7,069,574 B1 | 6/2006 | Adams et al. |
| 7,085,529 B1 | 8/2006 | Arsenault et al. |
| 7,130,576 B1 | 10/2006 | Gurantz et al. |
| 7,239,285 B2 | 7/2007 | Cook |
| 7,257,638 B2 | 8/2007 | Celik et al. |
| 7,260,069 B2 | 8/2007 | Ram et al. |
| 7,263,469 B2 | 8/2007 | Bajgrowicz et al. |
| 7,263,713 B2 | 8/2007 | Oishi et al. |
| 7,511,677 B2 | 3/2009 | Waltman |
| 7,519,680 B1 | 4/2009 | O'Neil |
| 7,522,875 B1 | 4/2009 | Gurantz et al. |
| 7,542,715 B1 | 6/2009 | Gurantz et al. |
| 7,603,022 B2 | 10/2009 | Putterman et al. |
| 2001/0055319 A1 | 12/2001 | Quigley et al. |
| 2002/0044614 A1 | 4/2002 | Molnar |
| 2002/0140617 A1 | 10/2002 | Luly et al. |
| 2002/0152467 A1 | 10/2002 | Fiallos |
| 2002/0154055 A1 | 10/2002 | Davis et al. |
| 2002/0154620 A1 | 10/2002 | Azenkot et al. |
| 2002/0178454 A1 | 11/2002 | Antoine et al. |
| 2002/0181604 A1 | 12/2002 | Chen |
| 2003/0023978 A1 | 1/2003 | Bajgrowitz |
| 2003/0129960 A1 | 7/2003 | Kato |
| 2003/0185174 A1 | 10/2003 | Currivan |
| 2003/0217362 A1 | 11/2003 | Summers et al. |
| 2003/0220072 A1 | 11/2003 | Coffin, III |
| 2004/0060065 A1 | 3/2004 | James et al. |
| 2004/0064689 A1 | 4/2004 | Carr |
| 2004/0068747 A1 | 4/2004 | Robertson et al. |
| 2004/0136455 A1 | 7/2004 | Akhter et al. |
| 2004/0153942 A1 | 8/2004 | Shtutman et al. |
| 2004/0161031 A1 | 8/2004 | Kwentus et al. |
| 2004/0184521 A1 | 9/2004 | Chen et al. |
| 2004/0185775 A1 | 9/2004 | Bell et al. |
| 2004/0192190 A1 | 9/2004 | Motoyama |

| | | | |
|---|---|---|---|
| 2004/0198237 A1 | 10/2004 | Abutaleb et al. | |
| 2004/0203425 A1 | 10/2004 | Coffin | |
| 2004/0209584 A1 | 10/2004 | Bargroff et al. | |
| 2004/0229583 A1 | 11/2004 | Ogino | |
| 2004/0244044 A1 | 12/2004 | Brommer | |
| 2004/0244059 A1 | 12/2004 | Coman | |
| 2004/0255229 A1 | 12/2004 | Shen et al. | |
| 2004/0261110 A1 | 12/2004 | Kolbeck et al. | |
| 2005/0002640 A1 | 1/2005 | Putterman et al. | |
| 2005/0033846 A1 | 2/2005 | Sankaranarayan et al. | |
| 2005/0052335 A1 | 3/2005 | Chen | |
| 2005/0054315 A1 | 3/2005 | Bajgrowicz et al. | |
| 2005/0057428 A1 | 3/2005 | Fujita | |
| 2005/0060525 A1 | 3/2005 | Schwartz, Jr. et al. | |
| 2005/0066367 A1 | 3/2005 | Fyke et al. | |
| 2005/0071882 A1 | 3/2005 | Rodriguez et al. | |
| 2005/0118984 A1 | 6/2005 | Akiyama | |
| 2005/0138663 A1 | 6/2005 | Throckmorton et al. | |
| 2005/0184923 A1 | 8/2005 | Saito et al. | |
| 2005/0190777 A1 | 9/2005 | Hess et al. | |
| 2005/0193419 A1 | 9/2005 | Lindstrom et al. | |
| 2005/0198673 A1 | 9/2005 | Kit et al. | |
| 2005/0204388 A1 | 9/2005 | Knudson et al. | |
| 2005/0229206 A1 | 10/2005 | Pugel et al. | |
| 2005/0240969 A1 | 10/2005 | Sasaki et al. | |
| 2005/0264395 A1 | 12/2005 | Bassi | |
| 2005/0289605 A1 | 12/2005 | Jeon | |
| 2006/0018345 A1 | 1/2006 | Nadarajah et al. | |
| 2006/0030259 A1 | 2/2006 | Hetzel et al. | |
| 2006/0041912 A1 | 2/2006 | Kuhns | |
| 2006/0080707 A1 | 4/2006 | Laksono | |
| 2006/0133612 A1 | 6/2006 | Abedi et al. | |
| 2006/0174282 A1 | 8/2006 | Dennison et al. | |
| 2006/0225104 A1 | 10/2006 | James et al. | |
| 2006/0259929 A1 | 11/2006 | James | |
| 2006/0294512 A1 | 12/2006 | Seiden | |
| 2007/0082644 A1* | 4/2007 | Ho et al. | 455/315 |
| 2007/0083898 A1 | 4/2007 | Norin et al. | |
| 2007/0202800 A1 | 8/2007 | Roberts et al. | |
| 2008/0064355 A1 | 3/2008 | Sutskover et al. | |
| 2008/0193419 A1 | 8/2008 | Lorence et al. | |
| 2009/0013358 A1 | 1/2009 | Throckmorton et al. | |
| 2009/0150937 A1 | 6/2009 | Ellis et al. | |
| 2009/0222875 A1 | 9/2009 | Cheng et al. | |
| 2009/0252316 A1 | 10/2009 | Ratmanski et al. | |

FOREIGN PATENT DOCUMENTS

| | | |
|---|---|---|
| DE | 197 49 120 | 6/1999 |
| DE | 10155481 | 5/2003 |
| EP | 0288928 | 11/1988 |
| EP | 1207688 | 5/2002 |
| EP | 1331810 | 7/2003 |
| EP | 1447987 | 8/2004 |
| FR | 2861939 | 5/2005 |
| GB | 2127257 | 4/1984 |
| GB | 2354650 | 3/2001 |
| JP | 57193190 | 11/1982 |
| JP | 59-211380 | 11/1984 |
| JP | 60153225 | 8/1985 |
| JP | 60165832 | 8/1985 |
| JP | 61195094 | 8/1986 |
| JP | 61238130 | 10/1986 |
| JP | 62026933 | 2/1987 |
| JP | 62-279785 | 12/1987 |
| JP | 02054637 | 8/1988 |
| JP | 01-255389 | 10/1989 |
| JP | 01-256823 | 10/1989 |
| JP | 2140022 | 5/1990 |
| JP | 02209026 | 8/1990 |
| JP | 03058521 | 3/1991 |
| JP | 2001-231033 | 2/2000 |
| JP | 2001237752 | 8/2001 |
| JP | 2003339030 | 11/2003 |
| WO | WO 97/19554 | 5/1997 |
| WO | 0150290 | 7/2001 |
| WO | WO 01/56297 | 8/2001 |
| WO | 02082351 | 10/2002 |
| WO | 03026187 | 3/2003 |
| WO | 03094520 | 11/2003 |
| WO | 2004054128 | 6/2004 |
| WO | WO 2004/054126 | 6/2004 |
| WO | WO 2004/105283 | 12/2004 |
| WO | 2005094075 | 10/2005 |
| WO | 2005114879 | 12/2005 |
| WO | 2006015186 | 2/2006 |
| WO | 2006017218 | 2/2006 |
| WO | WO 2006/026477 | 3/2006 |

OTHER PUBLICATIONS

Non-final Office Action dated May 26, 2009 in U.S. Appl. No. 11/581,718, filed Oct. 16, 2006, by John Norin et al.

Non-final Office Action dated Jul. 15, 2009, in U.S. Appl. No. 11/546,118, filed Oct. 11, 2006, by Kesse Ho et al.

Non-final Office Action dated Oct. 8, 2008, in U.S. Appl. No. 11/546,118, filed Oct. 11, 2006, by Kesse Ho et al.

Final Rejection dated Dec. 11, 2009, in U.S. Appl. No. 11/581,718, filed Oct. 16, 2006, by John Norin et al.

Non-final Office action dated Feb. 12, 2010, in U.S. Appl. No. 11/546,117, filed Oct. 11, 2006, by John Norin et al.

Non-final Office action dated Feb. 22, 2010, in U.S. Appl. No. 11/546,118, filed Oct. 11, 2006, by Kesse Ho et al.

Final Office action dated Jun. 22, 2010, in U.S. Appl. No. 11/546,118, filed Oct. 11, 2006, by Kesse Ho et al.

Non-final Office action dated Oct. 14, 2010 in U.S. Appl. No. 11/546,118 filed Oct. 11, 2006 by Kesse Ho et al.

"Digital Satellite Equipment Control, Bus Functional Specification"; Bus Functional Specification; Eutelsat; Paris, France; Feb. 25, 1998; XP002348247; entire document.

Muller, Klaus; "DisEqC-controlled Sat-Installations"; RFE Radio Fernsehen Elektronik; Huss Medien GMBH; Berlin, Germany; vol. 46, No. 5; May 1997; pp. 42-44; XP000731482 (original and English translation).

U.S. Appl. No. 10/255,344, filed Sep.25, 2002, inventor Thomas H. James, Non-final Communication dated Aug. 1, 2007.

Final Rejection dated Jan. 31, 2011 in U.S. Appl. No. 11/546,118 filed Oct. 11, 2006 by Kesse Ho et al.

Mussino, F., "Reception and distribution techniques for DBS signals in community antenna installations," Accession No. 2781941, Alta Frequenza, 55(2):105-11, Mar.-Apr. 1986—Abstract Only.

Mussino, F., "Evolution of the receiving and distribution installations of television signals: from terrestrial broadcasting to satellite broadcasting," Accession No. 2742699, Proc. Of the 32$^{nd}$ Congress on Electronics: Satellite Broadcasting, 243-50, 1985—Abstract Only.

Mussino, F., "The reception of direct broadcast satellite TV signals in the 12 GHz band, using the C-MAC packet system," Accession No. 2325813, Elettronica e Telecomunicazioni, 33(3):117-30, May-Jun. 1984—Abstract Only.

Mussino, F., "Centralized aerial systems [cable TV]," Accession No. 2306051, Radioindustria Elettronica—Televizione, 7(11):491-4, Nov. 1983—Abstract Only.

Chaplin, J.G., et al., "Satellite broadcast reception: the FM approach to signal distribution in individual and community antenna systems," Accession No. 2241798, EBU Review, Technical No. 202:274-81, Dec. 1983—Abstract Only.

Mussino, F., "Cabled distribution systems: wide-band and channelized reception methods," Accession No. 2207325, Elettronica e Telecomunicazoni, 32(5):229-33, Sep.-Oct. 1983—Abstract Only.

Mussino, F., "Intermodulation characteristics of the television broadcast satellite receivers," Accession No. 2095285, Alta Frequenza, 52(2):118-25, Mar.-Apr. 1983, Abstract Only.

Mussino, F., "Some problems of television reception," Accession No. 1850235, Electronica e Telecomunicazioni, 30(4):165-70, Jul.-Aug. 1981, Abstract Only.

Bava, G. et al., "Characteristics and structure of receivers for direct TV radiodiffusion by satellite in the 12 GHz band," Accession No. 1512676, Alta Frequenza, 48(12):714-25, Dec. 1979, Abstract Only.

Mussino, F., "Synchronous demodulator for television signals," Accession No. 1497282, Elettronica e Telecomunicazioni, 28(3):101-7, May-Jun. 1979, Abstract Only.

Mussino, F., "Windscreen antenna," Accession No. 1315746, Alta Frequenza, 47(10):720-7, Oct. 1978, Abstract Only.

Mussino, F., "Characteristics and problems with centralised antennae," Accession No. 1290455, Radioindustria Elettronica—Televizione 4:203-8, Apr. 1978, Abstract Only.

Mussino, F., "EMC measurements on the electrical equipment of cars," Accession No. 1117953, $2^{nd}$ symposium and technical exhibition on electromagnetic compatibility, 131-3, 1977, Abstract Only.

Mussino, F., "RF impedance of the electrical network of cars," Accession No. 1000748, International Symposium on Electromagnetic Compatibility, 418-23, 1976, Abstract Only.

Beccari, C. et al, "All-pass networks with constant phase difference," Accession No. 980800, Elettronica e Telecomunicazioni, 25(3):117-22, May-Jun. 1976, Abstract Only.

Mussino, F., "Measuring methods for CATV systems proposed by IEC," Accession No. 945815, Elettronica e Telecomunicazioni, 25(1):29-34, Jan.-Feb. 1976, Abstract Only.

Mussino, F., "Characteristics of CATV systems proposed by IEC," Accession No. 909134, Elettronica e Telecomunicazioni, 24(6):243-5, Nov.-Dec. 1975, Abstract Only.

Mussino, F., "Antenna amplifier for field strength measurements on wide frequency band,"Accession No. 544273, Elettronica e Telecomunicazioni, 22(2):49-52, Mar.-Apr. 1973, Abstract Only.

Mussino, F., "FM receiver with coherent demodulation," Accession No. 320402, Elettronica e Telecomunicazioni, 20(4):133-7, 1971, Abstract Only.

Mussino, F., "Coherent detection receivers for radio and television broadcasting," Accession No. 273689, Elettronica e Telecomunicazioni, 20(2):57-69, Mar.-Apr., 1971, Abstract Only.

Mussino, F. et al., "Stereophonic transmission system using double carrier modulation,"Accession No. 208381, Proceedings of the $17^{th}$ international congress on electronics, 415-21, 1970, Abstract Only.

Mussino, F., "A means of continuously varying phase," Accession No. 89438, Elettronica e Telecomunicazioni, 18(4):118-24, Jul. 1969, Abstract Only.

Carrillo, J.A. et al., "Stereophonic reception noise figure of 'pilot frequency' systems," Accession No. 22497, Elettronica e Telecomunicazioni, 17(5):162-6, Sep. 1968, Abstract Only.

Di Zenobio, D. et al., "A switching circuit scheme for a satellite site diversity system," Accession No. 3316999, 1988 IEEE International Symposium on Circuits and Systems. Proceedings (Cat. No. 88CH2458-8), 1:119-22, Abstract Only.

Holtstiege, H., "Satellite reception-tips and tricks of an expert," Accession No. 3132408, Funkschau, 4:57-8, 61-2, Feb. 12, 1988, Abstract Only.

Cominetti, M. et al., "Distribution of DBS signals of the MAC-family in collective antenna systems," Accession No. 3117800, New Systems and Services in Telecommunications, III: Networks, Cables, Satellites—The What, the How, the Why? Proceedings of the Third International Conference: 417-25, 1987, Abstract Only.

O'Neill, H.J. et al., "The distribution of C-MAC in cable systems," Accession No. 2856976, Cable Television Engineering, 13(7):294-301, Dec. 1986, Abstract Only.

Lowell, R.R. et al., "NASA's communication program examined for the 1980s and 1990s. I,"Accession No. 2801869, MSN Microwave Systems News & Communications Technology, 16(9):79-81, 83-5, 87-8, 90, Aug. 1986, Abstract Only.

Kudsia, C.M. et al., "RF channel characteristics and enhanced performance in future DBS satellites at 12 GHz in Region 2," Accession No. 2759373, AIAA $11^{th}$ Communication Satellite Systems Conference. Collection of Technical Papers: 220-4, 1986, Abstract Only.

Baker, S., "Eutelsat in the 90s," Accession No. 2569799, Cable & Satellite Europe, 7: Jul. 9-12, 1985, Abstract Only.

Hessenmuller, H., "The progress towards a unified colour television standard for satellite broadcasting in Europe," Accession No. 2569494, Fernmelde-Ingenieur, 39(8):1-36, Aug. 1985, Abstract Only.

Sultan, N. et al., "Reconfigurable dual feed antenna for direct broadcast satellites,"Accession No. 2496781, Acta Astronautica, 12(1):27-35, Jan. 1985, Abstract Only.

Gandy, C., "Antenna requirements and design options for DBS domestic reception," Accession No. 2358182, IBC 84. International Broadcasting Convention (Proceedings No. 240): 251-3, 1984, Abstract Only.

Renton, C., "RCA satcom Ku-band antenna system," Accession No. 2867860, AP-S International Symposium 1986. 1986 International Symposium Digest Antennas and Propagation (Cat. No. 86CH2325-9) 1:157-60, 1986, Abstract Only.

Sultan, N. et al., "A reconfigurable multiple shaped beam reflector antenna for direct broadcast satellite," Accession No. 2079246, Third International Conference on Antennas and Propagation ICAP 83: 203-7, pt. 1, 1983, Abstract Only.

Palumbo, B., "Dual polarized two-frequence slot array for a satellite electronically despun antenna," Accession No. 184451, 1969 European microwave conference: 147, 1970, Abstract Only.

Lenormand, R. et al., "CAD for HERMES antennas," Accession No. 3317368, AP-S Intenational Symposium 1988. 1988 International Symposium Digest: Antennas and Propagation (Cat. No. 88CH2563-5): 1:26-9, 1988, Abstract Only.

Naderi, F.M., "ACTS: the first step toward a switchboard in the sky," Accession No. 3190134, Telematics and Informatics, 5(1):13-20, 1988, Abstract Only.

Noda, H. et al., "Satellite TV receiving system," Accession No. 3152051, JRC Review, 26:45-50, 1988, Abstract Only.

Binder, R. et al., "The multiple satellite system-low altitude survivable communications," Accession No. 3095999, MILCOM 87: 1987 IEEE Military Communications Conference. 'Crisis Communications: The Promise and Reality'. Conference Record (Cat. No. 87CH2493-5), 2:620-5, 1987, Abstract Only.

Hori, T. et al., "Electronically steerable spherical array antenna for mobile earth station," Accession No. 2935203, Fifth International Conference on Antennas and Propagation (ICAP 87) (Conf. Publ. No. 274), 1:55-8, 1987, Abstract Only.

Yamamoto, H. et al., "Communications equipment for multibeam satellites," Accession No. 2727289, Telecommunication technologies 1985/1986: 109-18, 1985, Abstract Only.

Thurl, W. et al., "Satellite receiving station for TV programme distribution," Accession No. 2480868, Mikrowellen Magazin, 10(6):604-6, Dec. 1984, Abstract Only.

Alaria, G.B. et al., "SS/TDMA satellie system with on board TST switching stage," Accession No. 2342421, CSELT Rapporti Tecnici, 12(3):247-55, Jun. 1984, Abstract Only.

Kudrna, K., "Preliminary test results of the electronic switching spherical array antenna," Accession No. 2324225, ITC/USA/'83. International Telemetering Conference: 11-17, 1983, Abstract Only.

Vidal Saint-Andre, B. et al., "A multi-element primary feed system and associated switch device designed for TDMA communication satellites," Accession No. 2290842, Annales des Telecommunications, 39(1-2):76-83, Jan.-Feb. 1984, Abstract Only.

Bongiovanni, G., et al., "Optimal switching algorithm for multibeam satellite systems with variable bandwidth beams," Accession No. 2258153, IBM Technical Disclosure Bulletin, 26(8):4344-8, Jan. 1984, Abstract Only.

Saint-Andre, B.V., et al., "A multi-element primary feed system and associated switch device designed for TDMA communication satellites," Accession No. 2257271, GLOBECOM '83. IEEE Global Telecommunications Conference. Conference Record: 3:1645-9, 1983, Abstract Only.

Spisz, E.W., "NASA development of a satellite switched SS-TDMA IF switch matrix," Accession No. 2241614, CECON '83 Record: Cleveland Electrical/Electronics Conference and Exposition 1983: Nov. 19-27, 1983, Abstract Only.

Kudrna, K. et al., "The Electronica Switching Spherical Array (ESSA) antenna for the Earth Radiation Budget Spacecraft (ERBS)," Accession No. 2148187, ITC/USA/'82. International Telemetering Conference, 271-88, 1982, Abstract Only.

Kumagai, H. et al., "20 GHz band receiving facilities at sub-earth-station for CS site diversity switching experiments," Accession No. 2147104, Review of the Radio Research Laboratories, 28(147):553-60, Sep. 1982, Abstract Only.

Kennedy, W.A., "UHE airborne satcom antenna systems," Accession No. 2111199, Midcon/80 Conference Record: 8/1/1-6, 1980, Abstract Only.

Grant, I. et al., "The SKYSWITCH project," Accession No. 2111056, Telecommunications, 17(1):80, 88, Jan. 1983, Abstract Only.

King-tim, Ko et al., "A space-division multiple-access protocol for spot-beam antenna and satellite-switched communication network,"

Accession No. 2079577, IEEE Journal on Selected Areas in Communications, vol. SAC-1, No. 1:126-32, Jan. 1983, Abstract Only.
Farrell, P.G., "Modulation and coding," Accession No. 2464817, International Journal of Satellite Communications, 2(4):287-304, Oct.-Dec. 1984, Abstract Only.
Beach, M.A. et al., "An adaptive antenna array for future land mobile satellite terminals," Accession No. 3416971, Sixth International Conference on Antennas and Propagation (ICAP 89) (Conf. Publ. No. 301), 1:326-30, 1989, Abstract Only.
Johannsen, K.G., "Ground station tracking of dual linearly polarized satellites," Accession No. 922037, IEEE Transactions on Aerospace and Electronic Systems, vol. AED-11, No. 6: 1333-45, Nov. 1975, Abstract Only.
Harvey, R.V., "Simplifying the planning of frequency assignments for satellite broadcasting," Accession No. 1069917, EBU Review, Technical 159:218-28, Oct. 1976, Abstract Only.
Nakagawa, M., "Satellite broadcasting in Japan," Accession No. 3473565, AEU 3:50-3, 1989, Abstract Only.
Vuong, X.T. et al., "Some practical strategies for reducing intermodulation in satellite communications," Accession No. 3401833, IEEE Transactions on Aerospace and Electronica Systems, 24(6):755-65, Nov. 1988, Abstract Only.
Poulton, G.T. et al., "Earth-station antennas for multiple satellite access," Accession No. 3352237, Journal of Electrical and Electronics Engineering, Australia, 8(3):168-76, Sep. 1988, Abstract Only.
Alper, A.T., "Capacity allocation in a multi-transponder communications satellite with a common reconfigurable multiple-beam antenna," Accession No. 1790796, IEEE 1981 International Conference on Communications, 54.5/1-5, vol. 3, 1981, Abstract Only.
Matsushita, M. et al., "Some considerations on achieving optimum receiving systems for satellite broadcasting," Accession No. 306770, Proceedings of the $8^{th}$ international symposium on space technology and science, 719-25, 1969, Abstract Only.
Lewis, V., "SMATV-Phase 1-updating MATV systems (UK)," Electronic Technology 23(1):10-15, Jan. 1989, Abstract Only.
Keen, K.M. et al., "Techniques for the measurement of the cross-polarisation radiation patterns of linearly polarised, polarisation-diversity satellite ground-station antennas," Accession No. 1933335, IEE Proceedings H (Microwaves, Optics and Antennas) 129(3):103-8, Jun. 1982, Abstract Only.
DiFonzo, D.F., "Antennas: Key to communications satellite growth," Accession No. 1279523, Microwave Systems News 8(6):83-5, 87, 90-1, Jun. 1, 1978, Abstract Only.
Dement, D.K., "NASA's revitalized role in satellite communications," Accession No. 1527953, IEEE Communications Magazine, 18(1):37-41, Jan. 1980, Abstract Only.
Kalliomaki, K. et al., "Electronically tracking antenna system for satellite reception," Accession No. 150587, IEEE Transactions on Aerospace and Electronic Systems, vol. AES-6, No. 3:405-7, May 1970, Abstract Only.
Inoue, T. et al., "30/20 GHz band SCPC satellite communication using small earth stations," Accession No. 2191343, IEEE Journal on Selected Areas in Communications, vol. SAC-1, No. 4:600-8, Sep. 1983, Abstract Only.
Jacobs, I.M. et al., "Trends in military satellite communication networks," Accession No. 1611408, AIAA $8^{th}$ Communications Satellite Systems Conference 762-5, 1980, Abstract Only.
Davies, R. et al., "Packet communications in satellites with multiple-beam antennas and signal processing," Accession No. 1611382, AIAA $8^{th}$ Communications Satellite Systems Conference, 378-85, 1980, Abstract Only.
Raymond, H.G. et al., "An advanced mixed user domestic satellite system architecture," Accession No. 1611364, AIAA $8^{th}$ Communications Satellite Systems Conference, 148-53, 1980, Abstract Only.
Pennoni, G. et al., "An SS-TDMA satellite system incorporating an onboard time/space/time switching facility: overall system characteristics and equipment description," Links for the Future. Science, Systems & Services for Communications. Proceedings of the International Conference on Communications-ICC 84, 2:800-6, 1984, Abstract Only.
Greborio, G.B., "Direct Satellite Television: Distribution System for New Centralized Antenna Installations," Electronics and Telecommunications, 6:271-284, 1984.

Chaplin, J.G. et al., "Satellite broadcast reception: the FM approach to signal distribution in individual and community antenna systems," EBU Review, Technical No. 202, Dec. 1983, 11 pgs.
Sharifi, M.H. et al., "A Multiple Access Technique for Centralized Multiple Satellite Networking with On-Board Processing in the Central Node," IEEE, 1012-1021, 1988.
Schmidt, R.L. et al., "Transmission of Two NTSC Color Television Signals Over a Single Satellite Transponder Via Time-Frequency Multiplexing," IEEE Transactions on Communications, vol. Com-31, 11:1257-1266, Nov. 1983.
Pfund, E.T., "Direct Television Broadcasting with a Medium-Size Satellite," IEEE, 121-129, 1988.
Lee, L-S., "A Polarization Control System for Satellite Communications with Multiple Uplinks," IEEE Transactions on Communications, vol. Com-26, No. 8, 1201-1211, Aug. 1978.
Naderi, F.M., "Advance Satellite Concepts for Future Generation VSAT Networks," IEEE Communications Magazine, Sep. 13-22, 1988.
Granlund, J. et al., "Diversity Combining for Signals of Different Medians," IRE Transactions on Communications Systems, 138-145, 1961.
Davies, P.G. et al., "Measurements of SIRIO Transmissions near 11.6 GHz at Slough (UK)," Alta Frequenza, 332-158 E-338-164 E, 1979.
Chakraborty, D., "Survivable Communication Concept Via Multiple Low Earth-Orbiting Satellites," IEEE Transactions on Aerospace and Electronic Systems, 25(6):879-889, Nov. 1989.
Buntschuh, R.F., "First-Generation RCA Direct Broadcast Satellites," IEEE Journal on Selected Areas in Communications, vol. SAC-3, No. 1, 126-134, Jan. 1985.
Bridle, M., "Satellite Broadcasting in Australia," IEEE Transactions on Broadcasting, vol. 34, No. 4, 425-429, Dec. 1988.
Bertossi, A.A. et al., "Time Slot Assignment in SS/TDMA Systems with Intersatellite Links," IEEE Transactions on Communications, vol. COM-35, No. 6, 602-608, Jun. 1987.
Stephens, G.M., "European DBS: On the Brink," Satellite Communications, Jul. 1988.
Weinberg, A., "On the Passage of High-Level Pulsed Radio Frequency Interference Through a Nonlinear Satellite Transponder," IEEE Transactions on Communications, vol. Com-32, No. 1, Jan. 13-24, 1984.
Tasaka, S., "The SRUC Protocol for Satellite Packet Communication—A Performance Analysis," IEEE Transactions on Communications, vol. Com-34, No. 9, 937-945, Sep. 1986.
Seth, A.K., "Satellite Communication Experiments in the Country," J. Instn. Electronics & Telecom. Engrs., 28(5):199-207, 1982.
Saleh, A.A.M. et al., "Distributed Antennas for Indoor Radio Communications," IEEE Transactions on Communications, vol. Com-35, No. 12, 1245-1251, Dec. 1987.
Jeruchim, M.C., "On the Application of Importance Sampling to the Simulation of Digital Satellite and Multihop Links," IEEE Transactions on Communications, vol. Com-32, No. 10, 1088-1104, Oct. 1984.
Kavehrad, M., "Direct-Sequence Spread Spectrum with DPSK Modulation and Diversity for Indoor Wireless Communications," IEEE Transactions on Communications, vol. Com-35, No. 2, 224-241, Feb. 1987.
Mosely, J. et al., "A Class of Efficient Contention Resolution Algorithms for Multiple Access Channels," IEEE Transactions on Communications, vol. Com-33, No. 2, 145-151, Feb. 1985.
Jain, C.L. et al., "A Direct Reception System for Time Synchronization Via InSat-1," J. Instn. Electronics & Teleom. Engrs, 27(10):470-476, 1981.
Gopal, I.S., et al., "Scheduling in Multibeam Satellites with Interfering Zones," IEEE Transactions on Communications, vol. Com-31, No. 8, 941-951, Aug. 1983.
Gopal, I.S. et al., "Point-to-Multipoint Communication Over Broadcast Links," IEEE Transactions on Communications, vol. Com-32, No. 9, 1034-1049, Sep. 1984.
Gole, P. et al., "Effect of Ice-Induced Cross-Polarization on Digital Earth-Space Links," IEEE Transactions on Communications, vol. Com-32, No. 1, 70-81, Jan. 1984.

Jacobs, I.M. et al., "Trends in Military Satellite Communication Networks," American Institute of Aeronautics and Astronautics, Inc., 762-765, 1980.

Glance, B. et al., "Frequency-Selective Fading Effects in Digital Mobile Radio with Diversity Combining," IEEE Transactions on Communications, vol. Com-31, No. 9, 1085-1094, Sep. 1983.

Cox, D.C., "Antenna Diversity Performance in Mitigating the Effects of Portable Radiotelephone Orientation and Multipath Propagation," IEEE Transactions on Communications, vol. Com-31, No. 5, 620-628, May 1983.

Cimini, Jr., L.J., "Analysis and Simulation of a Digital Mobile Channel Using Orthogonal Frequency Division Multiplexing," IEEE Transactions on Communications, vol. Com-33, No. 7, 665-675, Jul. 1985.

Cartledge, J.C., "Outage Performance of QAM Digital Radio Using Adaptive Equalization and Switched Space Diversity Reception," IEEE Transactions on Communications, vol. Com-35, No. 2, 166-180, 1987.

Dubrovnik, International Telecommunication Union, Recommendations and Reports of the CCIR, 1986, CCIR Report 473-4, pp. 190-211 (see 198-200, 204)—XVIth Plenary Assembly, 1986—vols. X and XI—Part 2, Broadcasting Satellite Service (Sound and Television).

Notice of Allowance dated Mar. 16, 2011 in U.S. Appl. No. 11/546,117 filed Oct. 11, 2006 by John L. Norin et al.

Final Rejection dated Mar. 31, 2011 in U.S. Appl. No. 11/581,718 filed Oct. 16, 2006 by John Norin et al.

* cited by examiner

US 7,991,348 B2

TRIPLE BAND COMBINING APPROACH TO SATELLITE SIGNAL DISTRIBUTION

CROSS-REFERENCE TO RELATED APPLICATIONS

This application claims the benefit under 35 U.S.C. §119 (e) of the following co-pending and commonly-assigned U.S. provisional patent applications:

Application Ser. No. 60/725,781, filed on Oct. 12, 2005 by John L. Norin and Kesse Ho, entitled "TRIPLE STACK COMBINING APPROACH TO Ka/Ku SIGNAL DISTRIBUTION,"

Application Ser. No. 60/725,782, filed on Oct. 12, 2005 by Kesse Ho and John L. Norin, entitled "SINGLE LOCAL OSCILLATOR SHARING IN MULTI-BAND KA-BAND LNBS,"

Application Ser. No. 60/726,118, filed on Oct. 12, 2005 by John L. Norin, entitled "KA/KU ANTENNA ALIGNMENT,"

Application Ser. No. 60/726,149, filed on Oct. 12, 2005 by Kesse Ho, entitled "DYNAMIC CURRENT SHARING IN KA/KU LNB DESIGN,"

Application Ser. No. 60/726,150, filed on Oct. 12, 2005 by Kesse Ho, entitled "KA LNB UMBRELLA SHADE,"

Application Ser. No. 60/726,151, filed on Oct. 12, 2005 by John L. Norin and Kesse Ho, entitled "BAND UPCONVERTER APPROACH TO KA/KU SIGNAL DISTRIBUTION,"

Application Ser. No. 60/727,143, filed on Oct. 14, 2005 by John L. Norin and Kesse Ho, entitled "BAND UPCONVERTER APPROACH TO KA/KU SIGNAL DISTRIBUTION,"

Application Ser. No. 60/726,338, filed on Oct. 12, 2005 by John L. Norin, Kesse Ho, Mike A. Frye, and Gustave Stroes, entitled "NOVEL ALIGNMENT METHOD FOR MULTI-SATELLITE CONSUMER RECEIVE ANTENNAS,";

Application Ser. No. 60/754,737, filed on Dec. 28, 2005 by John L. Norin, entitled "KA/KU ANTENNA ALIGNMENT,";

Application Ser. No. 60/758,762, filed on Jan. 13, 2006 by Kesse Ho, entitled "KA LNB UMBRELLA SHADE,"; and Application Ser. No. 60/726,337, filed Oct. 12, 2005, entitled "ENHANCED BACK ASSEMBLY FOR KA/KU ODU," by Michael A. Frye et al., all of which applications are incorporated by reference herein.

BACKGROUND OF THE INVENTION

1. Field of the Invention

The present invention relates generally to a satellite receiver system, and in particular, to an antenna assembly for such a satellite receiver system.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

FIG. 1 illustrates a typical satellite television installation of the related art.

System 100 uses signals sent from Satellite A (SatA) 102, Satellite B (SatB) 104, and Satellite C (SatC) 106 (with transponders 28, 30, and 32 converted to transponders 8, 10, and 12, respectively), that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to television 114 for viewing by a user. There can be more than one satellite transmitting from each orbital location.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Each satellite 102-106 broadcasts downlink signals 120 in typically thirty-two (32) different sets of frequencies, often referred to as transponders, which are licensed to various users for broadcasting of programming, which can be audio, video, or data signals, or any combination. These signals have typically been located in the Ku-band Fixed Satellite Service (FSS) and Broadcast Satellite Service (BSS) bands of frequencies in the 10-13 GHz range. Future satellites will likely also broadcast in a portion of the Ka-band with frequencies of 18-21 GHz FIG. 2 illustrates a typical ODU of the related art.

ODU 108 typically uses reflector dish 122 and feedhorn assembly 124 to receive and direct downlink signals 120 onto feedhorn assembly 124. Reflector dish 122 and feedhorn assembly 124 are typically mounted on bracket 126 and attached to a structure for stable mounting. Feedhorn assembly 124 typically comprises one or more Low Noise Block converters 128, which are connected via wires or coaxial cables to a multiswitch, which can be located within feedhorn assembly 124, elsewhere on the ODU 108, or within house 110. LNBs typically downconvert the FSS and/or BSS-band, Ku-band, and Ka-band downlink signals 120 into frequencies that are easily transmitted by wire or cable, which are typically in the L-band of frequencies, which typically ranges from 950 MHz to 2150 MHz. This downconversion makes it possible to distribute the signals within a home using standard coaxial cables.

The multiswitch enables system 100 to selectively switch the signals from SatA 102, SatB 104, and SatC 106, and deliver these signals via cables 124 to each of the IRDs 112A-D located within house 110. Typically, the multiswitch is a five-input, four-output (5×4) multiswitch, where two inputs to the multiswitch are from SatA 102, one input to the multiswitch is from SatB 104, and one input to the multiswitch is a combined input from SatB 104 and SatC 106. There can be other inputs for other purposes, e.g., off-air or other antenna inputs, without departing from the scope of the present invention. The multiswitch can be other sizes, such as a 6×8 multiswitch, if desired. SatB 104 typically delivers local programming to specified geographic areas, but can also deliver other programming as desired.

To maximize the available bandwidth in the Ku-band of downlink signals 120, each broadcast frequency is further divided into polarizations. Each LNB 128 can receive both orthogonal polarizations at the same time with parallel sets of electronics, so with the use of either an integrated or external multiswtich, downlink signals 120 can be selectively filtered out from travelling through the system 100 to each IRD 112A-D.

IRDs 112A-D currently use a one-way communications system to control the multiswitch. Each IRD 112A-D has a dedicated cable 124 connected directly to the multiswitch, and each IRD independently places a voltage and signal combination on the dedicated cable to program the multiswitch. For example, IRD 112A may wish to view a signal that is provided by SatA 102. To receive that signal, IRD 112A sends a voltage/tone signal on the dedicated cable back to the multiswitch, and the multiswitch delivers the sata 102 signal to IRD 112A on dedicated cable 124. IRD 112B independently controls the output port that IRD 112B is coupled to, and thus may deliver a different voltage/tone signal to the multiswitch. The voltage/tone signal typically comprises a 13 Volts DC (VDC) or 18 VDC signal, with or without a 22 kHz tone superimposed on the DC signal. 13 VDC without the 22 kHz tone would select one port, 13 VDC with the 22 kHz tone would select another port of the multiswitch, etc. There can also be a modulated tone, typically a 22 kHz tone, where the modulation schema can select one of any number of inputs based on the modulation scheme. For simplicity and cost savings, this control system has been used with the constraint of 4 cables coming for a single feedhorn assembly 124, which therefore only requires the 4 possible state combinations of tone/no-tone and hi/low voltage.

To reduce the cost of the ODU 108, outputs of the LNBs 128 present in the ODU 108 can be combined, or "stacked," depending on the ODU 108 design. The stacking of the LNB 128 outputs occurs after the LNB has received and downconverted the input signal. This allows for multiple polarizations, one from each satellite 102-106, to pass through each LNB 128. So one LNB 128 can, for example, receive the Left Hand Circular Polarization (LHCP) signals from SatC 102 and SatB 104, while another LNB receives the Right Hand Circular Polarization (RHCP) signals from SatB 104, which allows for fewer wires or cables between the feedhorn assembly 124 and the multiswitch.

The Ka-band of downlink signals 120 will be further divided into two bands, an upper band of frequencies called the "A" band and a lower band of frequencies called the "B" band. Once satellites are deployed within system 100 to broadcast these frequencies, the various LNBs 128 in the feedhorn assembly 124 can deliver the signals from the Ku-band, the A band Ka-band, and the B band Ka-band signals for a given polarization to the multiswitch. However, current IRD 112 and system 100 designs cannot tune across this entire resulting frequency band without the use of more than 4 cables, which limits the usefulness of this frequency combining feature.

By stacking the LNB 128 inputs as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data. However, as mentioned above, current IRDs 112 cannot use the information in some of the proposed frequencies used for downlink signals 120, thus rendering useless the information transmitted in those downlink signals 120.

It can be seen, then, that there is a need in the art for a satellite broadcast system that can be expanded to include new satellites and new transmission frequencies.

SUMMARY OF THE INVENTION

To minimize the limitations in the prior art, and to minimize other limitations that will become apparent upon reading and understanding the present specification, the present invention discloses a method, apparatus and system for stacking signals in a satellite delivery system.

A system in accordance with the present invention comprises a first set of satellite signals broadcast in a first frequency band, wherein the first set of satellite signals is downconverted to a first intermediate frequency band of signals, a second set of satellite signals broadcast in a second frequency band, wherein the second set of satellite signals is downconverted to a second intermediate frequency band of signals and a third intermediate frequency band of signals, a combiner for receiving the receiving the first intermediate frequency band of signals, the second intermediate frequency band of signals, and the third intermediate frequency band of signals, and combining the first intermediate frequency band of signals, the second intermediate frequency band of signals, and the third intermediate frequency band of signals into a delivery signal, a distribution unit, coupled to the combiner, for distributing the delivery signal to a plurality of outputs, and at least one receiver, coupled to an output of the plurality of outputs, wherein at least one receiver processes at least the first intermediate band of signals in the delivery signal.

Such a system optionally further comprises the at least one receiver not processing at least the second intermediate band of signals in the delivery signal, a second receiver, coupled to a second output of the plurality of outputs, the second receiver processing the entire delivery signal, the first frequency band being a Ku band of frequencies, the second frequency band being a Ka-band of frequencies, the at least one receiver further processing off-air television signals, wherein the delivery signal and the off-air television signals have overlapping frequencies.

Other features and advantages are inherent in the system and method claimed and disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
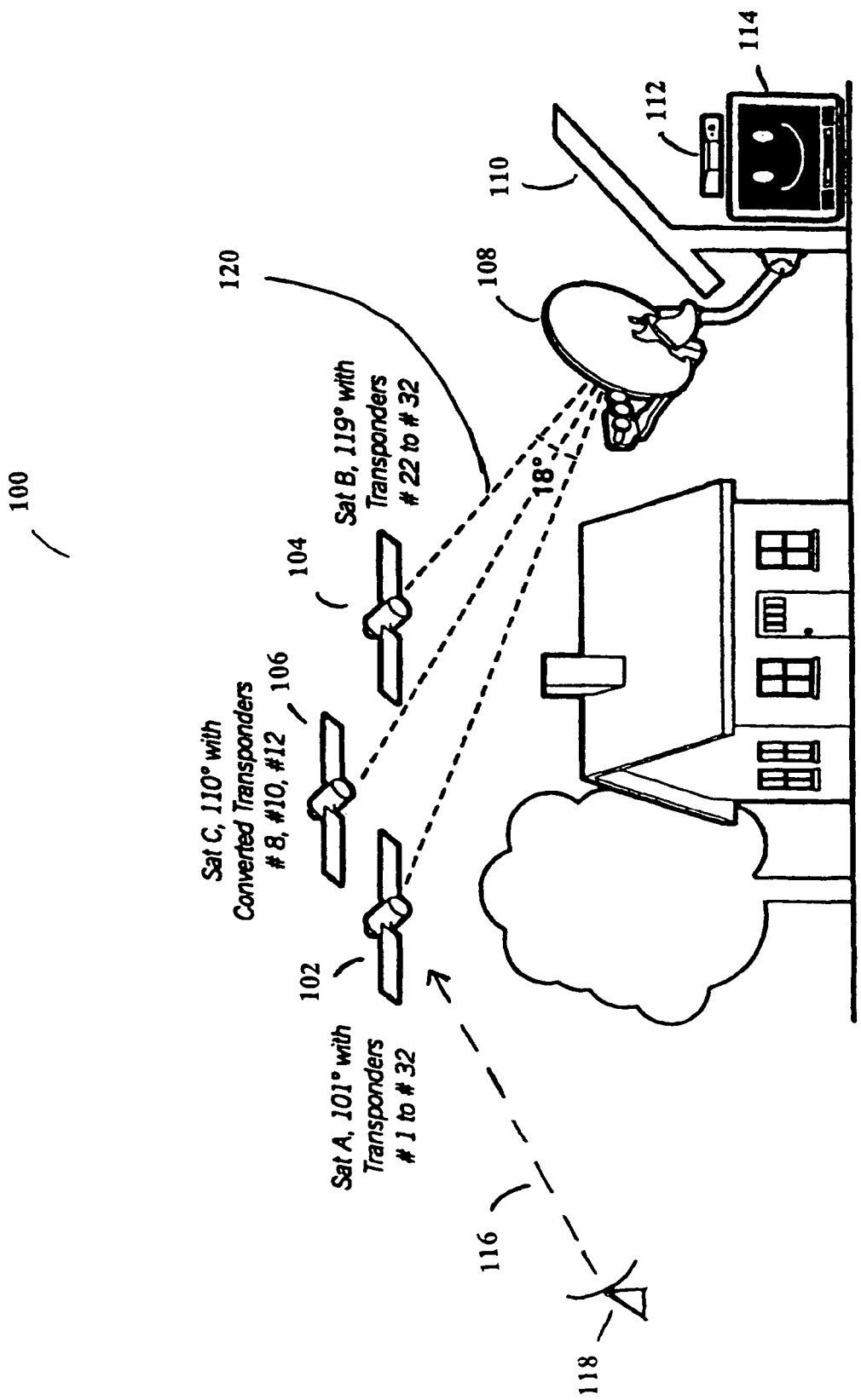
FIG. 1 illustrates a typical satellite television installation of the related art.
Figure 2:
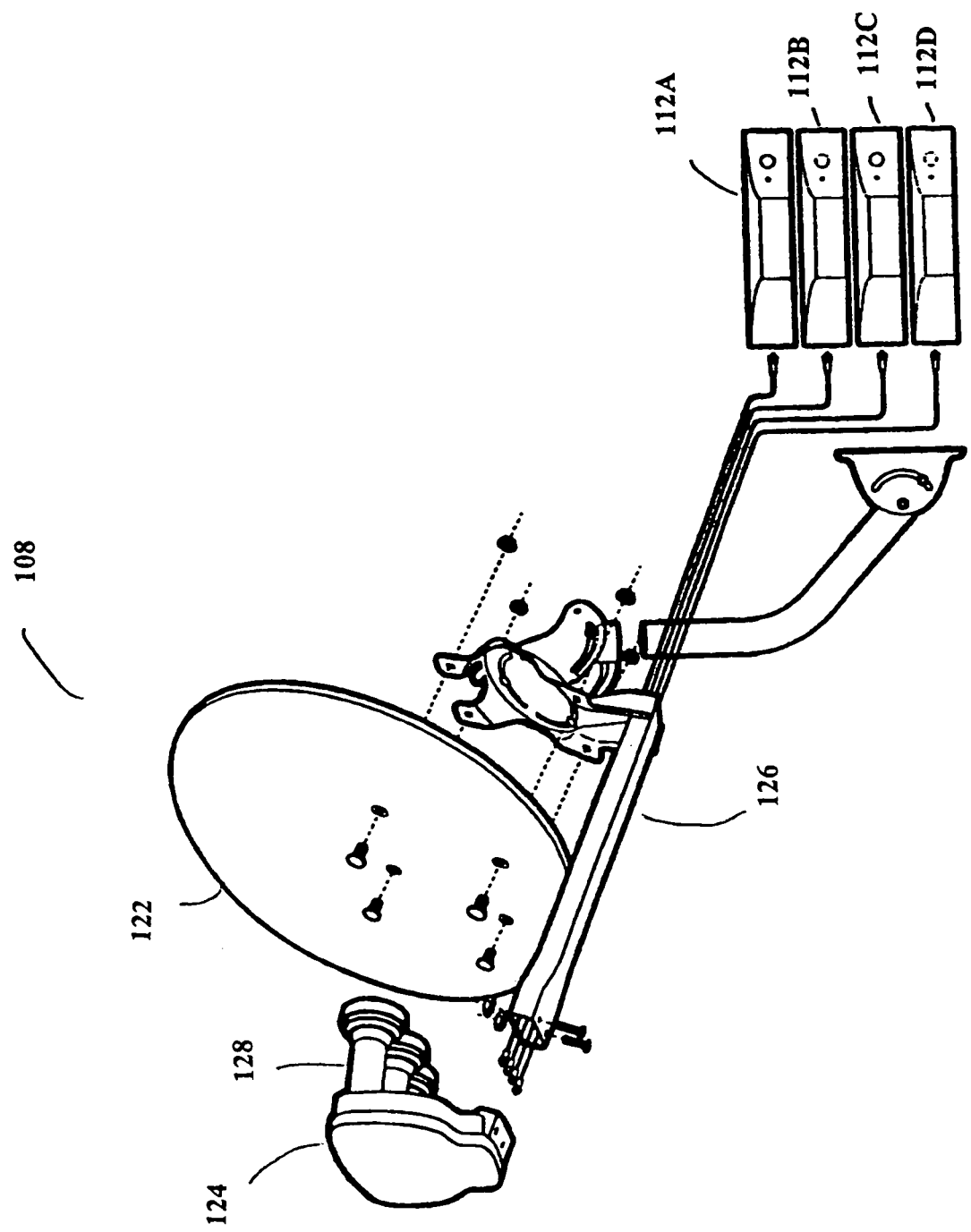
FIG. 2 illustrates a typical ODU of the related art.

In the following description, reference is made to the accompanying drawings which form a part hereof, and which show, by way of illustration, several embodiments of the present invention. It is understood that other embodiments may be utilized and structural changes may be made without departing from the scope of the present invention.

Overview

Currently, there are three orbital slots, each comprising one or more satellites, delivering direct-broadcast television programming signals to the various ODUs 108. However, ground systems that currently receive these signals cannot accommodate additional satellite signals without adding more cables, and cannot process the additional signals that will be used to transmit the growing complement of high-definition television (HDTV) signals. The HDTV signals can be broadcast from the existing satellite constellation, or broadcast from the additional satellite(s) that will be placed in geosynchronous orbit. The orbital locations of the Ku-BSS satellites are fixed by regulation as being separated by nine degrees, so, for example, there is a satellite at 101 degrees West Longitude (WL), SatA 102; another satellite at 110 degrees WL, SatC 106; and another satellite at 119 degrees WL, SatB 104. Additional satellites may be at other orbital slots, e.g., 72.5 degrees, 95, degrees, 99 degrees, and 103 degrees, and other orbital slots, without departing from the scope of the present invention. The satellites are typically referred to by their orbital location, e.g., SatA 102, the satellite at 101 WL, is typically referred to as "101." Additional orbital slots, with one or more satellites per slot, are presently contemplated at 99 and 103 (99.2 degrees West Longitude and 102.8 degrees West Longitude, respectively).

The present invention allows currently installed systems to continue receiving currently broadcast satellite signals, as well as allowing for expansion of additional signal reception and usage.

Multiswitch Port Selection

As described above, typically, the ports of a multiswitch are selected by the IRD 112 sending a DC voltage signal with or without a tone superimposed on the DC voltage signal to select a satellite 102-106. For example, and not by way of limitation, FOX News Channel may be located on transponder 22 from SatB 104. SatB 104 is typically selected by IRD 112 by sending an 18V signal with a 22 kHz tone superimposed on the 18V signal to the multiswitch, which then selects the downlink signal 120 coming from SatB 104. Additional processing is then done on signal 120 within IRD 112 to find the individual channel information associated with FOX News Channel, which is then displayed on monitor 114.

However, when new satellites 102-106 are operational, and additional signals as well as additional frequency bands become available, the currently distributed IRDs 112 must still operate, and new IRDs 112 capable of receiving, demodulating, and forwarding these new downlink signals 120 must also be able to perform these operations on existing and new signals.

The Ka-band of downlink signals 120 is divided into two RF (radio frequency) sub-bands and corresponding Intermediate Frequency (IF) sub-bands, an upper band of frequencies called the "A" band and a lower band of frequencies called the "B" band. Once satellites are deployed within system 100 to broadcast these frequencies, each assembly 124 can deliver the signals from the Ku-band, the A band Ka-band, and the B band Ka-band signals for a given polarization to the integrated or external multiswitch.

By stacking the LNB 128 inputs as described above, each LNB 128 typically delivers 48 transponders of information to the multiswitch, but some LNBs 128 can deliver more or less in blocks of various size. The multiswitch allows each output of the multiswitch to receive every LNB 128 signal (which is an input to the multiswitch) without filtering or modifying that information, which allows for each IRD 112 to receive more data.

New IRDs 112 can use the information in some of the proposed frequencies used for downlink signals 120, and thus the information transmitted in those downlink signals 120 will be available to viewers as separate viewer channels.

Rather than assign new satellite selection codes to the new satellites 102-106, which can be done by using different DC voltages and/or different tones, either alone or in combination, the present invention stacks the signals to allow both legacy (older) IRDs 112 and new IRDs 112 to receive the current downlink signals 120 using the already-known selection criteria (13/18 VDC, with or without 22 kHz tones), and for the new IRDs 112 that can receive and demodulate the new satellite downlink signals 120, those same codes will access the new satellite downlink signals 120, because those signals will be intelligently stacked on top of the current downlink signals 120.

ODU Design and Stacking Plan

In the present invention, the design of the Ka/Ku ODU using the newly-assigned Ka frequency bands (18.3 GHz-18.8 GHz; 19.7 GHz-20.2 GHz), incorporates the current design of millions of Ku (12.2 GHz-12.7 GHz) satellite receivers that are currently distributed to satellite television viewers. The present invention downconverts the Ka-band signals and the Ku-band signals to specific IF signal bands, and selectively combines them to enable the reception of both the Ka and the Ku signals using the traditional satellite selection topology of 13V, 18V, 13V/22 KHz and 18V/22 KHz.

Figure 3:
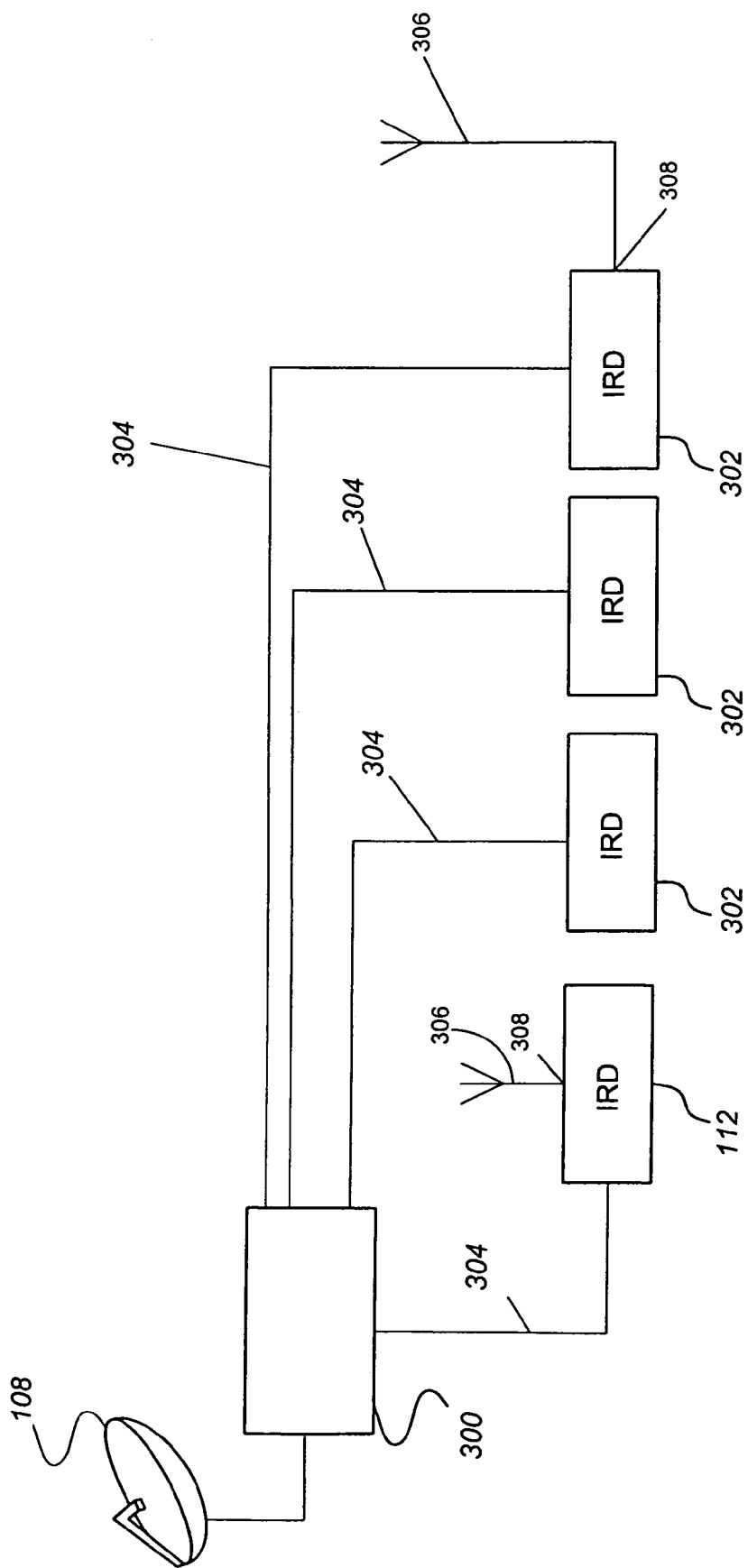
FIG. 3 illustrates a system diagram of the present invention.

FIG. 3 illustrates a system diagram of the present invention.

ODU 108 is coupled to distribution system 300, which is coupled to IRD 112 and new IRDs 302 via cables 304. Each of cables 304 carries commands from IRDs 112 and 302 back to distribution system 300, and also carries signals 120 that are received by ODU 108 and stacked by distribution system 300 in accordance with the present invention.

IRD 112, also referred to as a legacy IRD 112 or a currently deployed IRD 112, is only capable of demodulating signals in the 950-1450 MHz band, because the receiver located in IRD 112 is designed for that frequency band. However, IRD 302 can receive signals over the range of 950-2150 MHz. The 1650-2150 MHz band is usually referred to as the "A-band" or "Ka-high band" IF, while the 250-750 MHz band is referred to as the "B-band" or "Ka-low band" IF, as these bands are populated with downlink signals 120 that have been downconverted from the Ka-band. The 950-1450 MHz band is downconverted from the Ku-band of downlink signals 120. Additional functionality in distribution system 300 or in IRD 302 can shift the Ka-low IF to the Ka-high IF as needed by the IRD. Further, IRD 302 may be able to receive Ka-low IF frequencies with additional electronics either between ODU 108, as part of IRD 302, or other methods.

IRDs 112 and 302 also have the ability to connect antenna 306 to port 308, where off-air television signals can be coupled to IRD 112 and/or 302 can be processed by IRDs 112 and 302.

Figure 4:
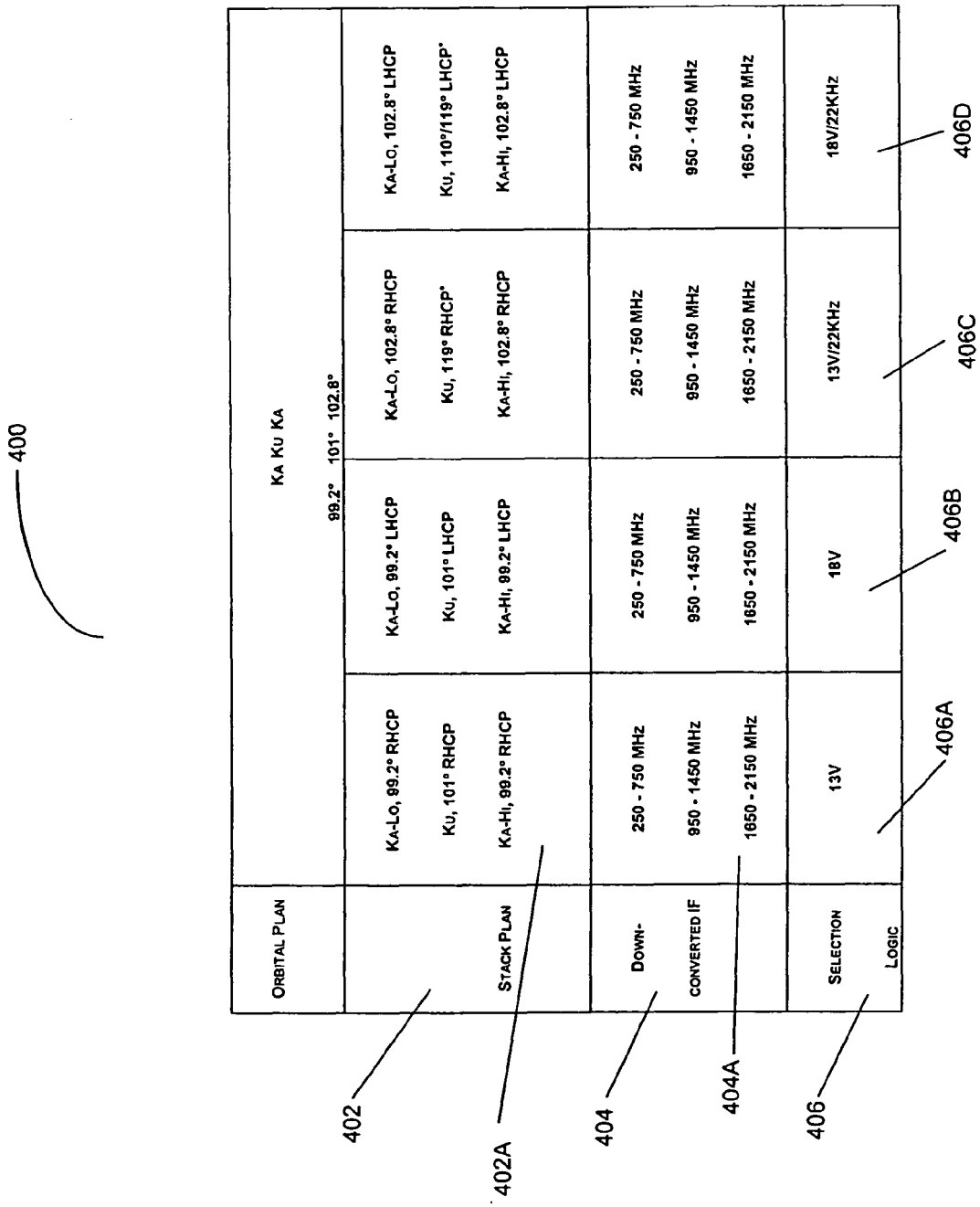
FIG. 4 illustrates the stack plan in accordance with the present invention.

FIG. 4 illustrates the stack plan in accordance with the present invention. Orbital plan 400 illustrates the stack plan 402, downconverted IF frequencies 404, and selection logic 406 for system 100 which includes satellites 102-106 as well as additional satellites operating at additional orbital slots and at additional frequencies. For example, and not by way of limitation, FIG. 4 illustrates orbital plan 400 comprising new satellites at 99.2 degrees West Longitude and at 102.8 degrees West Longitude, and broadcasting at the Ka-band of frequencies. However, other orbital slots, and other frequency bands, are possible within the scope of the present invention.

Selection logic 406 indicates how each IRD 112 and 302 select signals from a given grouping of satellites 102-106 as determined by the stack plan 402 and downcoverted IF 404. The legacy IRD 112 can only receive signals in the 950-1450 MHz range, which corresponds to satellites 102-106. For example, and not by way of limitation, if IRD 112 sends a 13V signal to the multiswitch resident in ODU 108, shown in box 406A, then the multiswitch will select a specific port, namely, the port that contains the signals from the satellites designated by stack plan 402A, which are downconverted to signals based on downconverted IF 404A. So, as shown in box 402A, the Right-Hand Circular Polarized (RHCP) signals from a Ka-band downlink signal 120 transmitted by a satellite 102-106 resident at 99.2 degrees West Longitude will be selected, as will the RHCP Ku-band downlink signal 120 transmitted by satellite 102 resident at 101 degrees West Longitude.

The Ku-band downlink signal 120 will be downconverted into the 950-1450 MHz band as shown in downconverted IF 404A, however, the Ka-band downlink signal 120 will be downcoverted into two different frequency bands. This use of the different Ka-band sub-bands is based on the satellite design and authorized FCC orbital frequency assignments, and allows for substantial capacity for the business to grow as needed to support high definition and newly emerging services. Other reasons for placing a given downlink signal 120 into either the A-band or B-band are contemplated within the scope of the present invention.

The entire set of RHCP Ka-band signals transmitted from 99.2 degrees can now be selected by sending a selection logic 406A signal of 13V. Similarly, the entire set of Left Hand Circularly Polarized (LHCP) Ka-band signals transmitted from 99.2 degrees can now be selected by sending a selection logic 406B signal of 18V, the entire set of RHCP Ka-band signals transmitted from 102.8 degrees can now be selected by sending a selection logic 406C signal of 13V with a 22 kHz tone superimposed, and the entire set of LHCP Ka-band signals transmitted from 102.8 degrees can now be selected by sending a selection logic 406D signal of 18V with a 22 kHz tone superimposed. Since these are the same selection signals used for current satellites 102-106, legacy IRDs 112 can still be mated with new ODUs 108 which can receive and downconvert Ka-band signals without reprogramming or decommissioning IRDs 112, while new IRDs 302 can receive all of the downconverted signals transmitted by satellites 102-106 and any new satellites.

So, a house 110 can have both legacy IRDs 112 and new IRDs 302 coupled to an ODU 108 of any vintage. Older ODUs that can only receive Ku-band signals 120 will still flow through to all IRDs 112 as in previous systems 100, and new IRDs 302 will be able to receive the Ku-band signals 120 as well. As a customer upgrades their ODU 108 to one that can receive and downconvert Ka-band signals 120 from new satellites (resident at 99.2 and 102.8, and elsewhere), existing IRDs 112 can still properly select Ku-band signals 120 as before, while new IRDs 302 can select not only the Ku-band signals 120, but the Ka-band signals 120, without any change in selection logic. Viewers can then choose which room in their house 110 to place legacy IRDs 112 and new IRDs 302 without the need for special hardware or other installation requirements.

Figure 5:
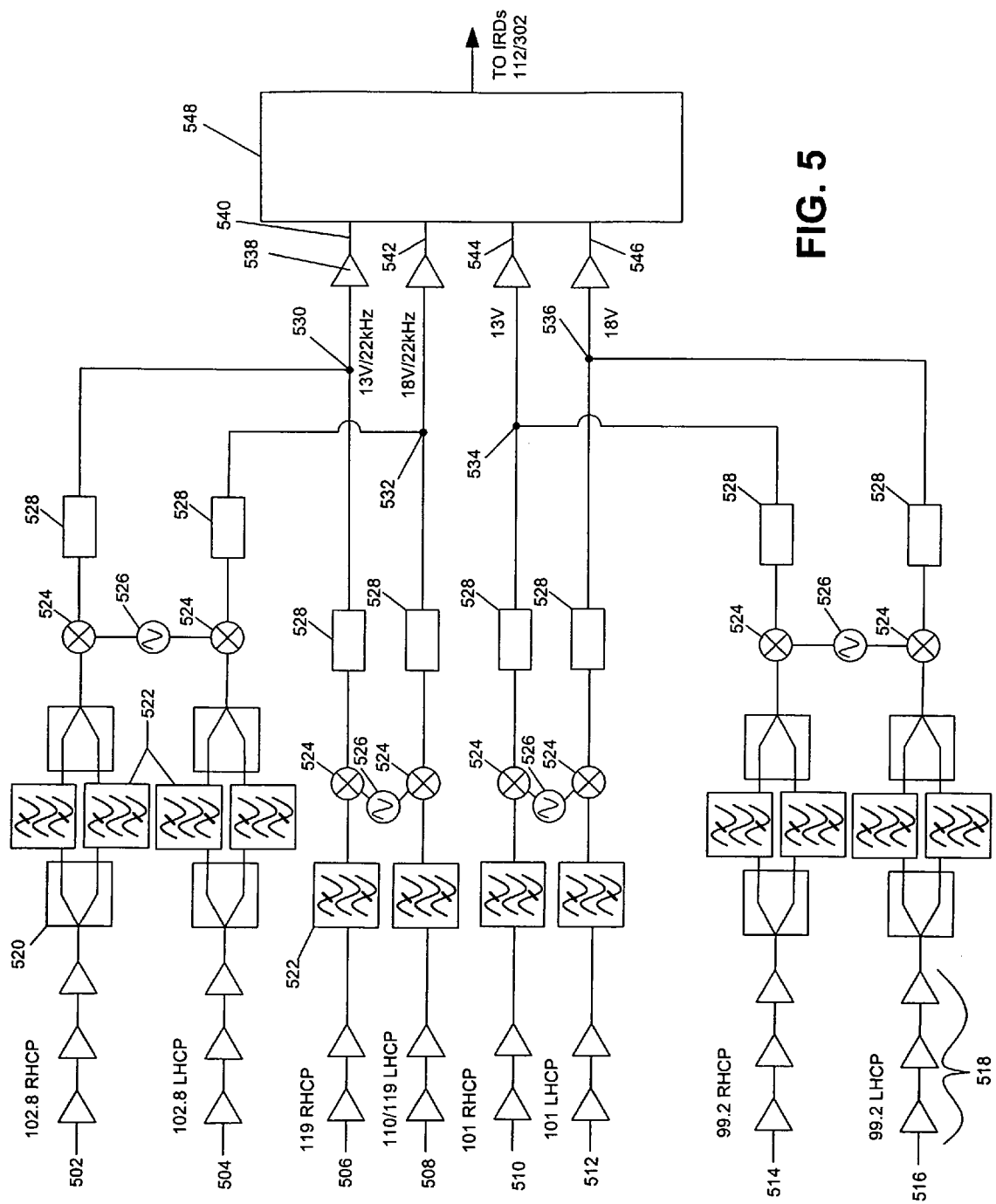
FIG. 5 illustrates an embodiment of the distribution and downconversion performed in accordance with the present invention.

FIG. 5 illustrates an embodiment of the distribution and downconversion performed in accordance with the present invention.

System 500 shows incoming downlink signals 502-516, which are referred to collectively as signals 120. However, since the present invention combines these signals 502-516 in a unique way, for clarification each of the signals 502-516 are referred to separately in discussing FIG. 5. Signal 502 is an RHCP signal transmitted by a satellite resident at 102.8 in the Ka-band of frequencies. Signal 504 is an LHCP signal transmitted by a satellite resident at 102.8 in the Ka-band of frequencies. Signal 506 is an RHCP signal transmitted by a satellite resident at 119 (SatB 104) in the Ku-band of frequencies. Signal 508 is an LHCP signal transmitted by satellites resident at 110 and 119 (SatC 106 and SatB 104, respectively) in the Ku-band of frequencies. Signal 510 is an RHCP signal transmitted by a satellite resident at 101 (SatA 102) in the Ku-band of frequencies. Signal 512 is an LHCP signal transmitted by a satellite resident at 101 (SatA 102) in the Ku-band of frequencies. Signal 514 is an RHCP signal transmitted by a satellite resident at 99.2 in the Ka-band of frequencies. Signal 516 is an LHCP signal transmitted by a satellite resident at 99.2 in the Ka-band of frequencies.

Low Noise Amplifiers (LNA) 518 amplify signals 502-516 in various stages of amplification. Signals that are transmitted in the Ka-band, namely, signals 502, 504, 514, and 516, are split using splitters 520, and then sent through different bandpass filters 522. For example, some of the bandpass filters are at the 19.7-20.2 GHz bandpass range, while others are at the 18.5-18.8 GHz range, to correspond to the transmitted frequencies present on signals 502, 504, 514, and 516. Signals 506-512 are also filtered through bandpass filters 522, at different passbands because of their different transmission frequencies.

Signals 502, 504, 514, and 516 are then recombined, and each signal 502-516 is then downconverted by mixers 524 and local oscillators 526A-526D to an IF for each of signals 502-516. For example, signal 502 is downconverted using a local oscillator 526A at a frequency of 18.00 GHz, and then bandpass or bandstop filtered as necessary with filter 528 such that the portion of signal 502 that was transmitted at the 19-7-20.2 GHz will have an IF of 1650-2150 MHz, and the portion of signal 502 that was transmitted at the 18.5-18.8 GHz will have an IF of 250-750 MHz, which correspond to the A-band and B-band respectively. Similarly, signals 506-512 are downconverted to the 950-1450 MHz range.

After filters 528, the signals are then combined as described with respect to FIG. 4 at points 530-536 respectively. Amplifiers 538 then amplify the combined signals 540-546, and pass them on to distribution point 548, which distributes all of the signals 540-546 to IRDs 112 and 302 connected in system 100.

As such, system 500 allows the existing IRDs 112 to be used with an ODU capable of receiving Ku-band and Ka-band signals, and IRDs 112 can decode and display portions of signals 540-546, namely, those portions corresponding to signals 506-512. However, new IRDs 302 can decode and display not only signals 506-516, but also the additional parts of signals 540-546 that correspond to signals 502, 504, 514, and 516.

Compatibility with Off-Air Signals

As shown in FIGS. 4 and 5, some of the signals 502-516 will be resident, after downconversion, in the 250-750 MHz band of frequencies, which is normally occupied by the off-air UHF/VHF broadcast channels (which are resident in the 54 MHz-860 MHz frequencies). The UHF/VHF band can still be realized at IRDs 112 and 302 by diplexing or can connect to the "VHF/UHF Antenna In" input on the IRDs 112/302 directly.

Conclusion

In summary, the present invention comprises a method, apparatus and system for stacking signals in a satellite delivery system. A system in accordance with the present invention comprises a first set of satellite signals broadcast in a first frequency band, wherein the first set of satellite signals is downconverted to a first intermediate frequency band of signals, a second set of satellite signals broadcast in a second frequency band, wherein the second set of satellite signals is downconverted to a second intermediate frequency band of signals and a third intermediate frequency band of signals, a combiner for receiving the receiving the first intermediate frequency band of signals, the second intermediate frequency band of signals, and the third intermediate frequency band of signals, and combining the first intermediate frequency band of signals, the second intermediate frequency band of signals, and the third intermediate frequency band of signals into a delivery signal, a distribution unit, coupled to the combiner, for distributing the delivery signal to a plurality of outputs, and at least one receiver, coupled to an output of the plurality of outputs, wherein the at least one receiver processes at least the first intermediate band of signals in the delivery signal.

Such a system optionally further comprises the at least one receiver not processing at least the second intermediate band of signals in the delivery signal, a second receiver, coupled to a second output of the plurality of outputs, the second receiver processing the entire delivery signal, the first frequency band being a Ku band of frequencies, the second frequency band being a Ka-band of frequencies, the at least one receiver further processing off-air television signals, wherein the delivery signal and the off-air television signals have overlapping frequencies.

It is intended that the scope of the invention be limited not by this detailed description, but rather by the claims appended hereto and the equivalents thereof. The above specification, examples and data provide a complete description of the manufacture and use of the composition of the invention. Since many embodiments of the invention can be made without departing from the spirit and scope of the invention, the invention resides in the claims hereinafter appended and the equivalents thereof.

What is claimed is:

1. A system for delivering satellite signals to a receiver, comprising:
    a first set of satellite signals broadcast in a first frequency band, wherein the first set of satellite signals is downconverted to a first intermediate frequency band of signals;
    a second set of satellite signals broadcast in a second frequency band, wherein the second set of satellite signals is downconverted to a second intermediate frequency band of signals and a third intermediate frequency band of signals;
    a combiner for receiving the first intermediate frequency band of signals, the second intermediate frequency band of signals, and the third intermediate frequency band of signals, and combining the first intermediate frequency band of signals, the second intermediate frequency band of signals, and the third intermediate frequency band of signals into a delivery signal; and
    a distribution unit, coupled to the combiner, for distributing the delivery signal to a plurality of outputs.

2. The system of claim 1, further comprising at least one receiver, coupled to an output in the plurality of outputs, wherein the at least one receiver cannot process at least the second intermediate band of signals in the delivery signal.

3. The system of claim 2, further comprising a second receiver, coupled to a second output of the plurality of outputs, wherein the second receiver processes the entire delivery signal.

4. The system of claim 3, wherein the first frequency band is a Ku band of frequencies.

5. The system of claim 4, wherein the second frequency band is a Ka-band of frequencies.

6. The system of claim 5, wherein the at least one receiver can further process off-air television signals.

7. The system of claim 6, wherein the delivery signal and the off-air television signals have overlapping frequencies.

8. A system for delivering satellite signals to a receiver, comprising:
    a plurality of satellites, wherein at least a first satellite in the plurality of satellites broadcasts a first set of satellite signals broadcast in a first frequency band, and at least a second satellite in the plurality of satellites broadcasts a second set of satellite signals in a second frequency band;
    an antenna, the antenna receiving the first set of satellite signals and the second set of satellite signals;
    a downconverter, coupled to the antenna, wherein the downconverter downconverts the first set of satellite signals to a first intermediate frequency band of signals and downconverts the second set of satellite signals to a second intermediate frequency band of signals and a third intermediate frequency band of signals;
    a combiner for receiving the first intermediate frequency band of signals, the second intermediate frequency band of signals, and the third intermediate frequency band of signals from the downconverter, the combiner combining the first intermediate frequency band of signals, the second intermediate frequency band of signals, and the third intermediate frequency band of signals into a delivery signal; and
    a distribution unit, coupled to the combiner, for distributing the delivery signal to a plurality of outputs.

9. The system of claim 8, further comprising at least one receiver, coupled to an output of the plurality of outputs, wherein the at least one receiver cannot process at least the second intermediate band of signals in the delivery signal.

10. The system of claim 9, further comprising a second receiver, coupled to a second output of the plurality of outputs, wherein the second receiver processes the entire delivery signal.

11. The system of claim 10, wherein the first frequency band is a Ku-band of frequencies.

12. The system of claim 11, wherein the second frequency band is a Ka-band of frequencies.

13. The system of claim 12, wherein the at least one receiver can further process off-air television signals.

14. The system of claim 13, wherein the delivery signal and the off-air television signals have overlapping frequencies.

15. A system for delivering satellite signals to a receiver, comprising:
    a plurality of satellites, wherein at least a first satellite in the plurality of satellites broadcasts a first set of satellite signals broadcast in a first frequency band, and at least a second satellite in the plurality of satellites broadcasts a second set of satellite signals in a second frequency band;
    an antenna, the antenna receiving the first set of satellite signals and the second set of satellite signals;
    a downconverter, coupled to the antenna, wherein the downconverter downconverts the first set of satellite signals to a first intermediate frequency band of signals and downconverts the second set of satellite signals to a second intermediate frequency band of signals and a third intermediate frequency band of signals;
    a combiner for receiving the first intermediate frequency band of signals, the second intermediate frequency band of signals, and the third intermediate frequency band of signals from the downconverter, the combiner combining the first intermediate frequency band of signals, the second intermediate frequency band of signals, and the third intermediate frequency band of signals into a delivery signal; and
    a distribution unit, coupled to the combiner, for distributing the delivery signal to a plurality of outputs.

16. The system of claim 15, further comprising at least a first receiver and a second receiver, the first receiver coupled to a first output of the plurality of outputs and the second receiver coupled to a second output of the plurality of outputs, wherein the second receiver processes the entire delivery signal.

17. The system of claim 16, wherein the first frequency band is a Ku-band of frequencies.

18. The system of claim 17, wherein the second frequency band is a Ka-band of frequencies.

19. The system of claim 18, wherein the at least one receiver can further process off-air television signals.

20. The system of claim 19, wherein the delivery signal and the off-air television signals have overlapping frequencies.

* * * * *